A. H. PEYCKE.
BRAKE MEANS.
APPLICATION FILED JUNE 10, 1918.
1,325,534. Patented Dec. 23, 1919.
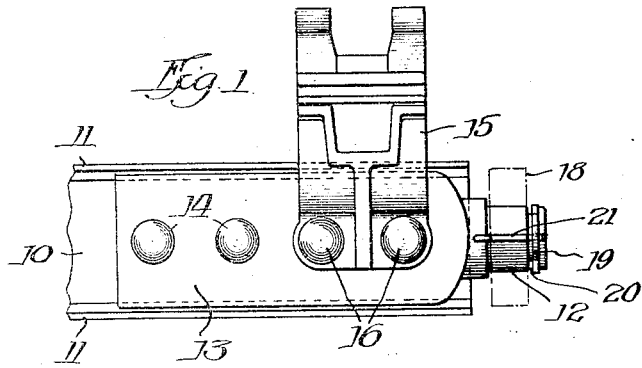
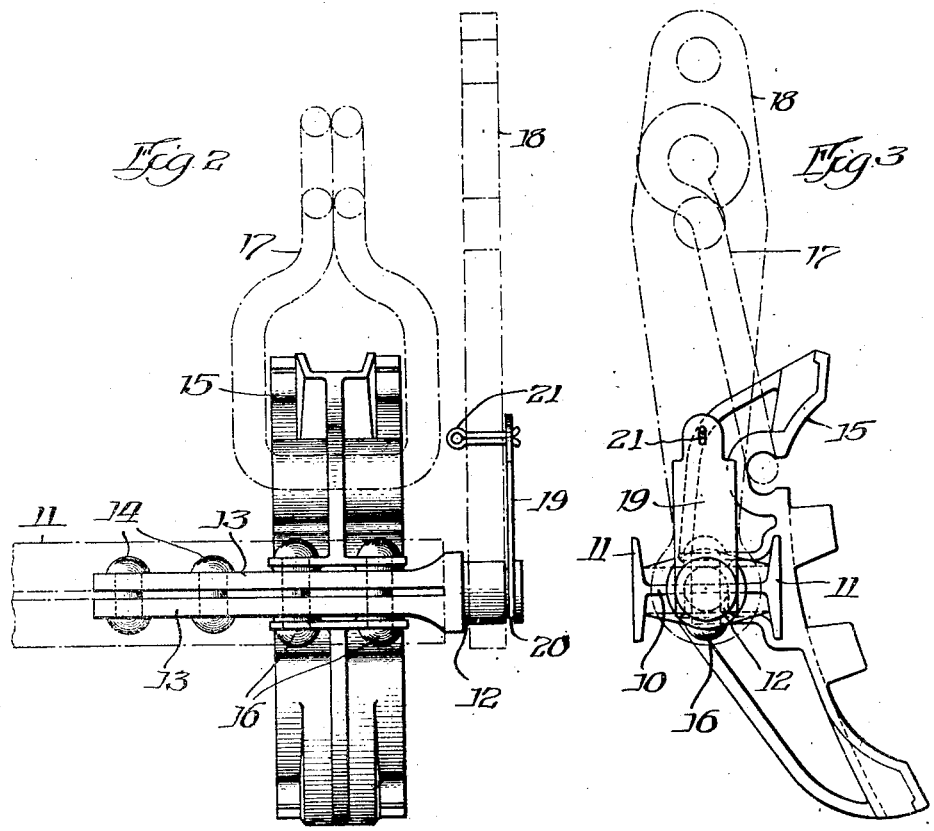
Witnesses:
Inventor
Armand H. Peycke,
By Wilkinson & Huxley
Attys

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MEANS.

1,325,534.   Specification of Letters Patent.   Patented Dec. 23, 1919.

Application filed June 10, 1918. Serial No. 239,104.

*To all whom it may concern:*

Be it known that I, ARMAND H. PEYCKE, a citizen of the United States, residing at Chicago, in the county of Cook and State of Illinois, have invented certain new and useful Improvements in Brake Means, of which the following is a specification.

This invention relates to brake means.

One of the objects of this invention is to simplify and improve means for operatively connecting brake beams, heads, hangers and levers to provide an effective combination of parts.

This and other objects are accomplished by the arrangement disclosed on the accompanying sheet of drawings, in which—

Figure 1 is a plan view;

Fig. 2 a rear elevation; and,

Fig. 3 a side elevation of brake means embodying my invention.

The various novel features of the invention will be apparent from the following description and drawings and will be particularly pointed out in the appended claims.

Referring to the figures of the drawings, it will be noted that I have shown a rolled brake beam having a web 10 and flanges 11. Connected to each end of the brake beam is a trunnion 12 having a pair of arms 13 which embrace the web 10 of the brake beam, said arms being secured to the web of said brake beam by rivets 14, or by any other suitable means. Mounted on the end of the brake beam adjacent the trunnion and over the arms 13 of the trunnion, is a brake head 15, the rivets 16 for securing the brake head to the beam passing through the arms 13 of the trunnion. The brake beam is hung by means of a loop hanger 17, said loop hanger being located at a point above the center line of the beam, or, in other words, an upper hanger head arrangement is provided.

A brake lever 18 is pivotally connected to the trunnion 12 on the outside of the brake head 15, said brake lever being held from accidental withdrawal from the trunnion by means of a locking plate 19 having its lower portion occupying a groove 20 in the outer end of the trunnion, the upper end of the locking plate 19 being secured to the brake lever by a cotter pin 21. This brake arrangement provides a simple, efficient and inexpensive combination of parts adapted for service conditions.

It is my intention to cover all modifications of the invention falling within the spirit and scope of the following claims.

I claim:

1. In brake mechanism, the combination of a brake beam, a trunnion member secured to the end of the beam and having a round portion, and a brake lever mounted on the round portion of said trunnion.

2. In brake mechanism, the combination of a brake beam, a trunnion secured to the end of the beam and having a round portion, and an operating member mounted on the round portion of said trunnion.

3. In brake mechanism, the combination of a brake beam, a trunnion member having arms secured to the brake beam, and a brake head carried by said beam and being mounted over and secured to the arms of said trunnion member.

4. In brake mechanism, the combination of a brake beam, a trunnion at the end thereof, a brake lever connected to said trunnion, and means including a locking plate carried by said brake lever coöperating with a portion of said trunnion member to prevent accidental withdrawal of the brake lever.

5. In brake mechanism, the combination of a brake beam of I-section, a trunnion member having laterally disposed arms embracing the web of said brake beam and having a groove, a brake head carried by said brake beam and mounted over and secured to the arms of said trunnion member, a brake lever connected to said trunnion member, and a locking plate connected to said brake lever and engaging said groove to prevent accidental withdrawal of the brake lever.

6. In brake mechanism, the combination of a brake beam, a trunnion at the end thereof, a brake head carried by said beam, a brake hanger connected to said head, and a brake lever connected to said trunnion.

Signed at Chicago, Illinois, this 28th day of May, 1918.

ARMAND H. PEYCKE.